(12) United States Patent
Hjelmsmark (10) Patent No.: US 11,813,576 B2
(45) Date of Patent: Nov. 14, 2023

(54) FILTER-PLATE ASSEMBLY WITH EXTERNAL FLOW AREAS AND ATTACHED MEMBRANES

(71) Applicant: Sani Membranes ApS, Allerød (DK)

(72) Inventor: Henrik Hjelmsmark, Værløse (DK)

(73) Assignee: Sani Membranes ApS, Allerød (DK)

( * ) Notice: Subject to any disclaimer, the term of this patent is extended or adjusted under 35 U.S.C. 154(b) by 85 days.

(21) Appl. No.: 16/978,521

(22) PCT Filed: Mar. 8, 2019

(86) PCT No.: PCT/DK2019/050084
§ 371 (c)(1),
(2) Date: Sep. 4, 2020

(87) PCT Pub. No.: WO2019/170207
PCT Pub. Date: Sep. 12, 2019

(65) Prior Publication Data
US 2021/0016228 A1    Jan. 21, 2021

(30) Foreign Application Priority Data

Mar. 8, 2018  (DK) .......................... PA 2018 70149

(51) Int. Cl.
*B01D 63/08* (2006.01)
*B01D 69/06* (2006.01)

(52) U.S. Cl.
CPC .......... *B01D 63/084* (2013.01); *B01D 69/06* (2013.01); *B01D 2313/125* (2013.01);
(Continued)

(58) Field of Classification Search
CPC ............... B01D 63/084; B01D 69/06; B01D 2313/125; B01D 2313/14; B01D 2317/02;
(Continued)

(56) References Cited

U.S. PATENT DOCUMENTS

| 4,115,274 A | 9/1978 | Boddeker |
| 4,310,416 A | 1/1982 | Tanaka |

(Continued)

FOREIGN PATENT DOCUMENTS

| CH | WO2004094048 A1 * | 11/2004 |
| CN | 1124174 A | 6/1996 |

(Continued)

OTHER PUBLICATIONS

English language machine translation of WO2004094048, 6 Pages, No Date.*

(Continued)

*Primary Examiner* — Pranav N Patel
(74) *Attorney, Agent, or Firm* — NIXON PEABODY LLP (57) ABSTRACT

A cross flow filtration unit, which provides a planar, rigid filter plate for filtration of liquid media. The plate has a planar membrane, which is fluid tight bonded at its edges to the surface of a partly hollow supporting plate having exit openings, internal flow channels, and flow areas for a first liquid medium. The membrane is in fluid contact with said the liquid medium at its internal surface and being in fluid contact with a second liquid medium at its external surface.

20 Claims, 6 Drawing Sheets

(52) U.S. Cl.
CPC ...... *B01D 2313/14* (2013.01); *B01D 2317/02* (2013.01); *B01D 2317/06* (2013.01)

(58) Field of Classification Search
CPC .......... B01D 2317/06; B01D 2313/105; B01D 63/082; B01D 63/08; B01D 63/081; B01D 65/003; B01D 2315/10; B01D 29/05; B01D 2313/08; B01D 2313/025; B01D 25/26; B01D 2319/02; B01D 2319/022; B01D 2319/025
See application file for complete search history.

(56) References Cited

U.S. PATENT DOCUMENTS

| | | | |
|---|---|---|---|
| 4,500,426 A | 2/1985 | Ishii | |
| 4,816,150 A | 3/1989 | Pierrard | |
| 5,160,433 A | 11/1992 | Niesen | |
| 5,626,752 A | 5/1997 | Mohn | |
| 6,117,322 A | 9/2000 | Miller | |
| 6,322,698 B1 | 11/2001 | Rios | |
| 2005/0115891 A1 | 6/2005 | Vellinga | |
| 2007/0023346 A1 | 2/2007 | Harms | |
| 2008/0190847 A1 | 8/2008 | Cantwell | |
| 2009/0211977 A1 | 8/2009 | Miller | |
| 2010/0288690 A1* | 11/2010 | Rautio | B01D 63/08 210/347 |
| 2010/0326914 A1 | 12/2010 | Drost et al. | |
| 2013/0043189 A1 | 2/2013 | Krause | |
| 2015/0014232 A1 | 1/2015 | McGinnis | |
| 2016/0059159 A1 | 3/2016 | Steen | |
| 2017/0007968 A1 | 1/2017 | Hjelmsmark | |
| 2017/0182463 A1 | 6/2017 | Hjelmsmark | |

FOREIGN PATENT DOCUMENTS

| | | | |
|---|---|---|---|
| CN | 1193289 | A | 9/1998 |
| DE | 19807769 | A1 | 8/1999 |
| DE | 102004051671 | A1 | 4/2006 |
| EP | 0662341 | A1 | 7/1995 |
| EP | 1224965 | A1 | 7/2002 |
| EP | 1470853 | A1 | 10/2004 |
| EP | 1 810 742 | A1 | 7/2007 |
| EP | 2223736 | A1 | 9/2010 |
| EP | 2236196 | A2 | 10/2010 |
| EP | WO2015114141 | * | 8/2015 |
| GB | 1381681 | A | 1/1975 |
| JP | S59-62323 | A | 4/1984 |
| JP | H08-10587 | A | 1/1996 |
| JP | H08-155278 | A | 6/1996 |
| JP | H10-180051 | A | 7/1998 |
| JP | H10-180052 | A | 7/1998 |
| JP | 2007-268388 | A | 10/2007 |
| JP | 2008-183561 | A | 8/2008 |
| JP | 2008-237961 | A | 10/2008 |
| JP | 2012-045515 | A | 3/2012 |
| TW | 200920471 | A | 5/2009 |
| WO | WO 03/059494 | A1 | 7/2003 |
| WO | WO 2009/045269 | A1 | 4/2009 |
| WO | WO 2013/113928 | A1 | 8/2013 |

OTHER PUBLICATIONS

International Search Report and Written Opinion in International Application No. PCT/DK2019/050084, dated Jul. 3, 2019 (11 pages).

* cited by examiner

FILTER-PLATE ASSEMBLY WITH EXTERNAL FLOW AREAS AND ATTACHED MEMBRANES

CROSS-REFERENCE TO RELATED APPLICATIONS

This application is a U.S. National Stage of International Application Patent No. PCT/DK2019/050084, filed on Mar. 8, 2019, which claims the benefit of and priority to Denmark Patent Application No. PA 2018 70149, filed on Mar. 8, 2018, the contents of which are incorporated herein by reference in their entireties.

FIELD OF THE INVENTION

The invention relates to a filter-plate having external flow areas for liquid media, the filter-plate being further equipped with a filter membrane bonded adjacent to at least one flow area, such as the membrane being bonded at the perimeter of the filter-plate. The filter-plate may be formed by various methods, such as 3D printing, or the filter-plate may be formed by bonding of two flat half filter-plates. Such half filter-plates are essentially identical having an external surface and an internal surface, where the bonding together of two internal surfaces of two half plates, such as along the half plate perimeter, forms the filter-plate.

Two or more of the filter-plates of the invention may be stacked and bonded together into an assembly that may be mounted in a flow housing having inlet and outlet for liquid media, e.g. retentate, permeate, or cleaning solutions, or a first and a second liquid medium. Moreover, the invention relates to a method of manufacturing said assembly using discrete inlet pieces.

DESCRIPTION OF THE PRIOR ART

US2017182463 (A1) discloses an internally channeled or hollow filter-plate configured for cross-flow filtration. The filter-plate comprises two half filter-plates being bonded at the periphery to form said filter-plate with perforations such as slits leading to internal flow channels for permeate, and wherein said filter-plate comprises an integrated protrusion in the form of a rim around the plate exit, and when a plurality of filter-plates is bonded into a filter-plate assembly, said protrusions combined form said permeate exit from the filter-plate assembly. The filter-plate may further comprise a filter membrane bonded to the external surface. Moreover, the plate surface at the filtration area can be corrugated to increase turbulence over the filter area.

EP 1470853 (A1) discloses a rigid membrane supporting device having the form of an open latticework built from lattice steps defining 'flow areas' in the form of intermediate gaps or open spaces. The latticework can support a membrane filter.

U.S. Pat. No. 5,160,433 relates to a laboratory scale ultrafiltration apparatus wherein a membrane on a solitary membrane supporting plate is positioned in a plate-and-frame device and where the membrane supporting plate is provided with exit openings being horizontal or in the same plane as the supporting plate.

However, there is an increasing need for more efficient filtration equipment in terms of energy consumption and cleanability, such as when filtrating turbid and/or viscous media, and for simplified production of filter-plates where product versatility is desirable.

SUMMARY OF THE INVENTION

It is a purpose of the present invention to provide a filter-plate without the perforations of the prior art for a filter-plate assembly, where said filter-plate has improved liquid flow turbulence for increased flux, which facilitates the cleaning operation, and where the manufacturing is easily scalable. In addition, it is an object of the present invention to provide a filter-plate with optimized flow path for a first liquid medium, where the medium is in fluid contact through the filter-plate exit with the internal surface of a membrane being bonded to at least one surface of the filter-plate and where said filter-plate when mounted in a housing provides reduced pressure loss of a second medium flowing past the external surface of the membrane, such as in a forward osmosis operation.

Said purpose may be achieved with a filter-plate according to claim 1. In the invention, flow areas on the external surfaces of the filter-plate is provided as an integrated drainage grid that supports the attached membrane while giving room for drain, such as for flow of liquid media or permeate which, through perforations into the filter-plate, is in fluid connection with at least one exit opening in the filter-plate or vice versa. Said fluid connection may be achieved through at least one internal fluid connecting area suitable for leading a liquid medium from the external flow area to at least one exit opening.

The filter-plate of the invention is a partly internally channeled filter-plate (1) which may be formed by bonding, such as edgewise sealing, of two flat and essentially identical, half filter-plates (2, 3), where the filter effect is formed by at least one externally attached filter membrane (7), e.g. being bonded adjacent to the flow area (6) on the supporting plate, where the flow area is formed as a drainage grid for draining of permeate or for flow of draw media under the membrane, the flow area being an integral part of the external surface of the half filter-plates, and the flow area having perforations, such as slits or holes (10A, 10B) connecting to the one or more channels (9A, 9B) or fluid connecting area inside the filter-plate.

The flow area, also called fluid connecting area, inside the supporting plate of the filter-plate may be formed as one or more channels or a corrugated area connecting a flow of liquid medium with one exit, such as for permeate, or with two or more paired exits, such as for draw medium or cleaning medium, the exit openings (4, 5) being essentially perpendicular to the planar surface of the filter-plate, and the exit openings may suitably be in the form of a connecting ring shaped channel element or discrete inlet piece to be bonded to the plate at the opening or as a protruding part of the half plates forming exit channels for permeate to exit the filter-plate assembly when two or more filter-plates are stacked. Alternatively, the exit openings may be connected through discrete inlet pieces, such as being ring shaped, which together with the filter-plate exit openings form an exit channel when stacking two or more filter-plates into an assembly.

In a certain embodiment of the invention where the filter-plate has two or more fluidly connected exit openings, it is possible for forward osmosis purposes to lead a draw stream contacting the inside of the membrane surface or to clean the inside or permeate side of the filter plate by a flushing media from one exit to the other exit.

The flow area surface (6) of the filter-plate of the invention is covered by bonding a semipermeable membrane (7), for example an organic flat sheet membrane, to the filter-plate surface, whereby very fine micro or ultrafiltration or even molecular filtration and forward osmosis can be achieved.

Thus, the present invention relates to a planar, filter-plate and assembly thereof, e.g. for cross-flow filtration of liquid media, said filter-plate having a semipermeable membrane that is suitable for filtration bonded onto at least one outer surface of a supporting plate with integrated flow areas on the plate surface and flow paths for a first liquid media inside the plate and the membrane being in fluid contact with an outer second liquid media. The filter-plate comprises a supporting plate having a first and a second planar, preferably rectangular, surface enclosing at one or more fluidly connected exit openings, internal flow channels, and at least one flow area for a first liquid media, said area being formed to enable fluid contact between said first liquid and the internal surface of a membrane bonded at the perimeter onto the planar outer surface, said flow area being provided with perforations forming a fluid connection between flow area and internal channels, and said flow area being sealed at its periphery with the periphery of the membrane, the external surface of which is in fluid contact with a second liquid media, thus enabling cross-flow filtration or FO filtration. The flow area is in further embodiments formed as a drainage grid with grooves for draining and protrusions for support of the membrane. The filter-plate of the invention may be manufactured by 3-D printing or by edgewise bonding of two essentially identical half filter-plates.

Cross flow filtration is achieved with a filter-plate assembly, which provides a rigid stack of two or more planar filter-plates each having a planar filtration membrane fluid tight bonded at its edges to the surface of the filter-plate comprising a flow area for a first liquid medium, such as a draw medium or a permeated medium, at the membrane's internal surface, and the membrane being in fluid contact with a second liquid medium at its external surface. The flow area formed as an integral part of the filter-plate is connected through a flow path inside the filter-plate to at least one exit opening for the permeate, the flow path comprising internal flow channel(s) and hole(s) or perforations leading to the flow area for permeate to exit the filter-plate assembly.

In addition, the membrane may be liquid tight bonded to the supporting plate at one or more additional points or lines, such as at various points and lines across the supporting plate.

The filter-plate may, in certain embodiments, be formed by liquid tight bonding, such as edgewise bonding or fusion of two fitting and/or essentially identical half-plates made of a light material, such as plastics which allows for the half-plates to be formed by molding.

In an embodiment of the present filter-plate and filter-plate assembly permeate can flow in one or more flow areas through connecting channels or flow distribution areas into and out of the filter-plate, and, thus, fluid connecting to one or more flow areas each being sealed by a membrane bonded to the planar external plate surfaces, while a free flow of a second liquid medium is maintained on the outside of the membrane and, when two or more filter-plates are stacked into an assembly or module, flowing through gaps between the stacked plates of the module. The second liquid medium can be highly viscous and even contain larger particulate impurities providing that the medium does not block the free flow passage outside or between the filter-plates.

An advantage of the present invention is that it enables cleaning at both external and internal surfaces of the filter-plate and filter-plate assembly.

The filter-plate and assembly of the invention is suitable for applications, such as milk filtration, where sanitary requirements can be fulfilled with external flushing between module plates as well as with internal cleaning flushing of the flow paths of the supporting plate.

Definitions

The term "membrane" as used herein shall mean any type of fine filter or organic membrane, such as a semipermeable membrane or filtering membrane, e.g. an organic PVDF membrane on non-woven or a very fine woven filter. A wide variety of fine filters and cast membranes will be applicable for use in present invention. "Membrane" and "filtration membrane", "filtering membrane" or "filter membrane" is used interchangeably herein.

The term "flow area" as used herein shall mean a confined grid and optionally corrugated or mesh like external drainage area formed as an integral part of the external surface of the filter-plate ensuring unimpeded flow from the flow area to perforations forming a fluid connection between flow area and internal flow channels or just channels. The flow area may serve as a permeate drain area or a flow distribution area for a liquid medium, such as a draw medium or cleaning medium, in fluid contact with the inside of the membrane.

The terms "exit" and "exit opening" are used interchangeably herein, and the terms shall mean an opening for a flow of liquid media into and/or out of the filter-plate and filter-plate assembly of the invention. Each exit opens to both sides of the filter-plate or filter-plate assembly, and the exit(s) can at one or both sides be connected to the flow of the permeate or the first medium. In case of filter-plates of the invention having two or more paired exit openings these are in fluid connection through various channels and perforations to one or more flow areas on the filter-plate, thus allowing flow of liquid media from one exit opening to the other. In certain embodiments the connected exits are located at opposite ends of the planar filter-plate. The exit openings are preferably located on external surfaces of the filter plate in areas, where the filter plate external surface is not provided with a flow area and a membrane covering the flow area.

The terms "permeate", "first liquid medium", "first liquid media", and "cleaning liquid" may be used separately or interchangeably herein, and the terms are used for the media flowing in the flow area on the filter-plate and through the connecting channels or the like inside the filter-plate and being in fluid contact with the internal surface of the membrane.

The terms "second liquid medium" and "second liquid media" are interchangeably used herein, and may also include a retentate, and are used for the media flowing externally on the filter-plate and assembly thereof and being in fluid contact with the external surface of the membrane of the filter-plate.

"Internal surface" of the membrane shall herein mean the membrane surface facing the external or outer surface of the filter-plate and so the flow area and being in fluid contact with the permeate or first liquid medium.

"External surface" of the membrane shall herein mean the membrane surface facing the external or second liquid medium or retentate.

"Supporting plate" is in general the reference to a plate without membrane covering the flow area.

"Filter plate" is in general the reference to a plate with membrane covering the flow area.

"Filter plate assembly" is in general the reference to a stack of filter plates fluid tight bonded together at least the exits, these exits together forming a manifold for the filter plates, and so the exit from the filter plate assembly. The term "filter module" as used herein refers to a filter-plate assembly being mounted in a flow housing providing inlet and/or outlet means for a liquid medium to be filtered (a filter unit or filtration unit).

The terms "liquid tight sealing", "fluid tight sealing", and "liquid tight bonding", etc., are used interchangeably herein and may also specify gas tight sealing when the present filter-plate and assembly thereof is suitable for filtration of gas-to-gas (air-to-air) or gas-to-liquid.

The terms "viscous media" and "media having suspended solids" as used herein shall mean liquid media, such as dairy products, fruit and vegetable juice, mineral and vegetable oil, waste water of many kinds, media streams having a corrosive effect and the like.

In the context of the present invention, the term "groove" shall be understood as a depression or indentation formed in, but not through a surface, i.e. a groove has a bottom.

BRIEF DESCRIPTION OF THE DRAWINGS

In FIG. 3, the exit openings (4, 5) have eye-shaped rims. In other—not shown embodiments—the exit openings (4, 5) may have elliptical rims. Each of the sub-flow areas/flow area sections (6', 6", 6''', 6'''') is provided with a membrane (7) covering the sub-flow areas/flow area sections (6', 6", 6''', 6''''). Each membrane (7) is preferably attached to the edge/rim of the individual sub-flow areas/flow area sections (6', 6", 6''', 6''''). Alternatively, all of the sub-flow areas/flow area sections (6', 6", 6''', 6'''') may be covered by a single membrane (7) (not shown). In the figure, the filter plate (1) is shown with the sub-flow areas/flow area sections (6', 6", 6''', 6'''') formed in a single half plate. It will however be appreciated that the shown half-plate may be combined with a second half plate similar to the filter plates (1) in FIGS. 1A, 1 B and 2. FIG. 3 further shows an exemplary liquid media flow channel (9A, 9B), perforations (10A, 10B), and membrane (7) and a flow path between the membrane 7 and the exit openings (4, 5), said flow path comprising flow channels (9A, 9B), perforations (10A, 10B) and the subsections (6', 6", 6''', 6''''). FIG. 3 shows that the filter plate (1) has eight sub-flow areas/flow area sections (6', 6", 6''', 6''''), only four of which have been provided with reference numbers.

DETAILED DESCRIPTION OF THE INVENTION

Certain embodiments of the filter-plate (1) of the invention relates to a planar, rigid filter-plate (1) comprising a supporting plate (14) having at least a first (4) and a second exit opening (5) for a liquid medium. The first and the second exit openings (4, 5) are fluidly connected at least one external flow area (6) being provided on said supporting plate (14) via internal flow channels (9a, 9b) with perforations (10a, 10b). The at least one external flow area (6) is sealingly covered by a membrane (7) to provide fluid connection between said first exit opening (4) and said second exit opening (5): The flow area (6) is formed as a drainage grid (of grooves (12) and protrusions (13)) formed on and as a part of the outside or external surface of the supporting plate (14). In this embodiment the grid provides a flow area between the covering membrane (7) and the supporting plate surface (14), said membrane (7) being bonded at the perimeter of the flow area (6).

Hereby is achieved the possibility, with very minute pressure loss, to flush or create a cross flow over all areas and parts of the inside of the supporting plate (14) with a turbulent stream from one exit opening being in fluid connection to another exit opening, or the possibility to flow from one or both exit openings while at the same time having the possibility of applying a hydraulic pressure on the external surface of the membrane from an unimpeded cross flow of liquid media outside the filter-plate assembly. An applied pressure on the external surface of the membrane (7) may be needed to drive the flow and to keep the membrane fixed during operation.

The supporting plate (14) comprises at least one flow area (6) on one of its two external surfaces 2', 3', said flow area (6) being available for cross-flow filtration. The flow area (6) is overlaid with a membrane (7). The membrane (7) is sealed to the filter plate at the perimeter (16) of the flow area (6). The membrane (7) is bonded along the perimeter of said flow area, which is available for cross-flow filtration. The bonding provides liquid tight sealing of the internal surface (7") of the membrane (7) from the outside of the filter-plate assembly or module. Thereby, an area of the membrane 7 is substantially equal to the flow area (6).

Said flow area (6) is formed as an integral part of the supporting plate (14) and comprises indents or grooves (12) interchanging with protrusions (13). The flow area forms a drainage grid or mesh like flow area from the membrane 7 to the exit opening (4, 5) (via perforations (1A, 10B) and the flow channels (9A, 9B). The protrusions (13) can support or lift up the membrane (7) to withstand a hydraulic pressure, while allowing a substantial flow between an internal surface (7") of the membrane (7) and the flow area (6) of the supporting plate (14), even when a pressure being applied from the outside on the filter-plate (1) compresses the membrane (7) towards the external surface (2', 3') of the supporting plate. The membrane (7) may partly take form from the supporting flow area due to the outside pressure, hereby forming a three dimensional patterned or grid-like surface increasing the filtration efficiency.

The flow area (6) on the filter-plate is formed with at least one perforation in fluid connection with at least one internal flow channel, being in fluid connection with the at least one exit opening, such as by connecting to the exit opening through a channel manifold (11). The flow area (6) may conveniently be provided with a plurality of perforations (10a, 10b) in opposite ends of the flow area (6), hereby ensuring a uniform flow over the entire flow area available for filtration and ensuring minimal pressure loss through an adequate number of perforations, said perforations still small enough to ensure the lifting function for the applied pressure on the membrane (7) provided on said drainage grid, i.e. the flow area (6).

Said flow area (6) together with said flow channels (9a, 9b) and at least two fluidly connected exit openings (4, 5) allow for unimpeded and controlled flow of the first liquid medium through the supporting plate leading to enhanced turbulence conditions at the internal surface of the membrane. The unimpeded flow of the first and the second liquid media allows for a very homogenous pressure gradient over the membrane (7), thus improving operational lifetime, and making it possible to create a turbulence optimized over the entire sheet surface of the membrane, leading to a substantial turbulence and filtration improvement of the membrane area.

In an embodiment, said supporting plate (14) of the filter-plate (1) comprises two half-plates (2, 3) which are bonded together at the periphery of the half plates (2, 3). The two half-plates (2, 3) are essentially identical in shape keeping the number of parts of the unit/module at a minimum. The bonding at the perimeter of the half plates (2, 3) seals the internal surface (7") of the membrane (7) from the liquid medium flowing past the external surface (7') of the membrane (7) without any further need for a gasket. More bonding areas may be added inside the half plate (2, 3) to make the supporting plate (14) more rigid.

In an embodiment, the assembly of the filter-plate (1) is comprised by fusing of a membrane onto the outer surfaces (2', 3') of the supporting plate (14), which in turn is formed by bonding, such as by fusion or by molding, of two identically shaped half-plates (2, 3), and where the exit openings (4, 5) are formed as integrated parts of the two half-plates (2, 3).

Figure 1A:
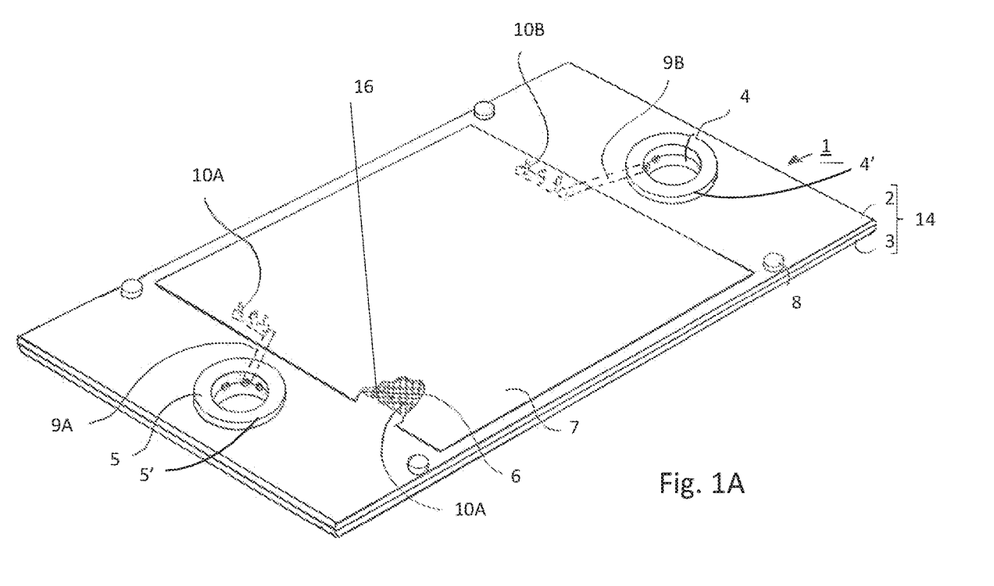
FIG. 1A is a perspective view of a filter-plate (1) comprising the supporting plate (14) comprising two half-plates, a first half-plate (2) and second half-plate (3), exit openings (4, 5) with cylindrical rims (4', 5'), flow area (6), membrane (7), bonding points (8), internal flow channels (9A, 9B), and perforations (10A, 10B) leading from the internal flow channels (9a, 9b) to the flow area (6).
Figure 2:
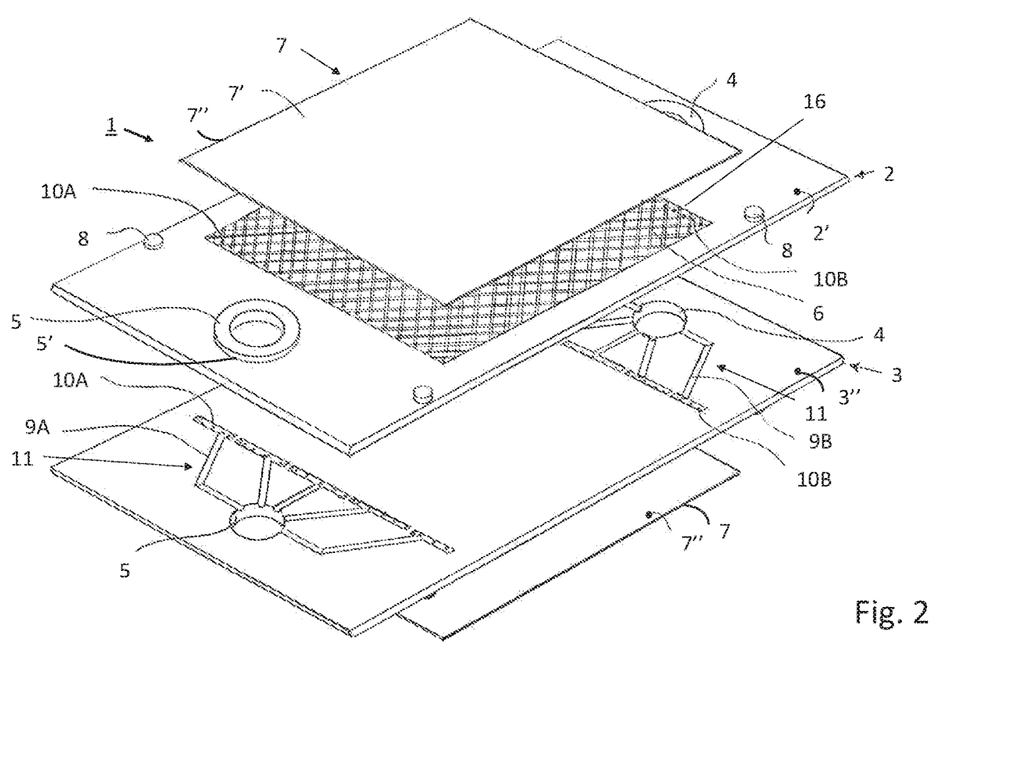
FIG. 2 is an exploded perspective view of a filter-plate showing the various parts as shown in FIG. 1, and showing in detail an embodiment of internal features of the supporting plate, such as a guided flow distribution with two opposite exit openings (4, 5) having fluid connection to five flow channels (9A and 9B) at each of two opposed ends of the filter plate (1) arranged in a manifold (11) to/from multiple perforations (10A, 10B) arranged in a line and leading flow to the flow area (6) of the two half-plates (2, 3) forming the supporting plate (14). The internal side of the first half-plate (2) is preferably mirrored by the internal side of the second half plate (3) such that the flow channels (9A, 9B) are formed by half-cylindrical grooves in the half plates, when the half plates have been connected. Likewise, the manifold (11) may preferably be formed from half-cylindrical grooves in each of the half-plates (2, 3).
Figure 3:
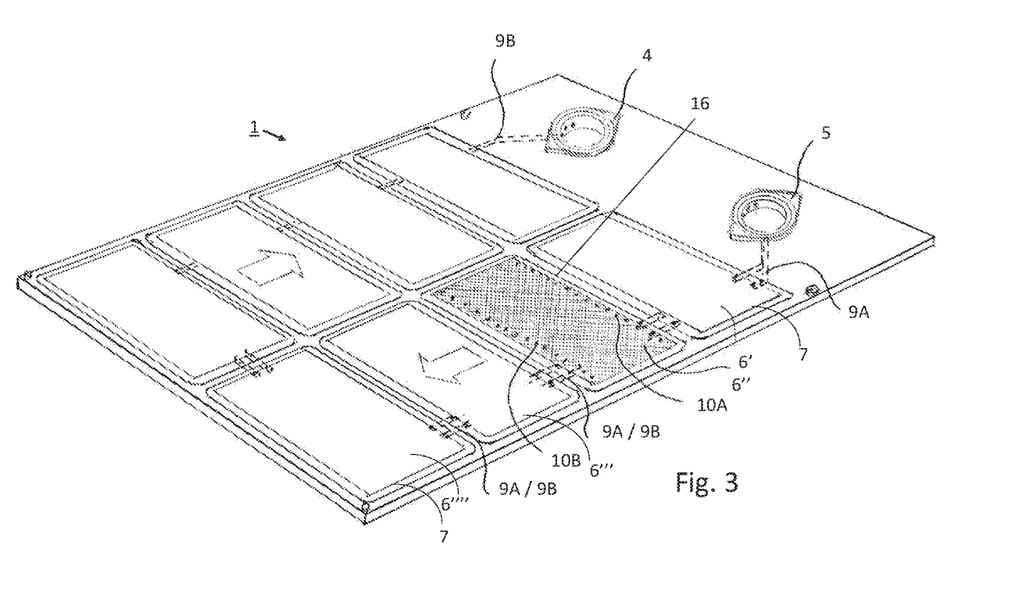
FIG. 3 is a perspective view that illustrates a filter-plate (1) having more than one section of drainage flow area where the flow area 6 is sectioned into sub-flow areas/flow area sections (6', 6", 6''', 6'''') on the supporting plate, and having two paired exit openings (4, 5) perpendicular to the longitudinal extension of the filter-plate.

In an embodiment, said at least two exit openings (4, 5) for the first liquid medium are positioned at a distance from each other and preferably outside the membrane covered area, whereby it is possible to clean the flow channels and area of the filter-plate effectively by flushing from one exit opening (4) to the other exit opening (5) by flushing with a cleaning liquid. The exit openings (4, 5) are preferably provided along an edge/perimeter of half plates (2, 3). They may be arranged at same edge, as shown in FIG. 3, or at opposite edges as shown in FIG. 1A and FIG. 2.

In an embodiment, the external surface (7') of the membrane (7) has an overlaying mesh structure, such as an overlaying fishbone like curve-shape similar to that seen in conventional plate heat exchangers. This overlaying shape is dimensioned to increase turbulence of the external flow of the second liquid medium, hereby optimizing filtration capacity at comparably lower external flow volumes.

In an embodiment, said at least one exit opening (4, 5) extends transversely to the planar surfaces of the supporting plate (14). The perpendicular exit openings allow for a large access area to the internal flow channels (9a, 9b) and flow areas forming the area available for filtration, and, at the same time, the relatively large flow channels (9a,9b) reduce counter pressure of flow to the exit openings. Thus, as example, high flow speeds between the two exit openings during flows or during cleaning operation are possible.

In an embodiment, said supporting plate comprises on its planar sides one or more raised more or less cylindrical rims (4', 5') or studs or protrusions surrounding the exit openings (4, 5). The combined or stacked cylindrical protrusions, when the filter-plates are stacked together fluid tight, form the exit path for the permeate or first liquid medium while keeping the number of assembly parts to a minimum. Said connected exit openings forming an exit manifold (not shown) that can be fused together at contact areas, hereby forming a manifold sealing the first internal media from the second external media.

In an embodiment, said supporting plate (14) comprises on its planar sides one or more exit openings (4, 5). The exit openings of juxtaposed filter-plates are connected by bonding these exits to both sides of an inlet piece, such as in the form of a disc like ring, when the filter plates (1) are stacked together while additional discrete inlet pieces are bonded to the exit openings (4, 5) or the rims (4', 5') of the two end plates of the stack to form the combined exit path for the permeate or first liquid medium from the filter-plate assembly. Said connected exits forming the assembly exit manifold that seals the first internal medium from the second external medium.

In an embodiment, said filter-plate (1) or filter-plate assembly comprises at least one filtration membrane (7) in fluid tight bonding or sealing covering a flow area (6) on the external surface (2', 3') of a supporting plate (14). Hereby, each filter-plate (1) may comprise two layers of membranes (7), i.e. provided on both sides (2', 3') of the supporting plate (14), such as where the internal membrane surface (7") is protected against the pressure exerted against the lifting points or raised contact points/protrusion 13 formed by the drainage grid of the flow area.

In an embodiment, said supporting plate (14) comprises, e.g. at its edge or perimeter, one or more bonding points (8) formed as raised studs for bonding two adjacent planar filter-plates (1) or bonding of a filter-plate (1) to an overlaying filter plate in a stack of filter-plates forming part of a filter module. The bonding points (8) together with the protruding exit opening rims or bonded on connecting washer like discs define the distance between two planar filter-plates in a stack or module. Said protruding exit openings (4, 5) with protruding rims 4', 5' of adjacent filter-plates (1) or connecting discs are bonded, such as by fusion, to achieve sealing between exit openings (4, 5) to provide an integrated flow path to the outside and external flow connections for liquid permeated media (first media) or for connections to a flow of cleaning liquid through the bonded plurality of planar filter-plates (1) forming the module.

Figure 6:
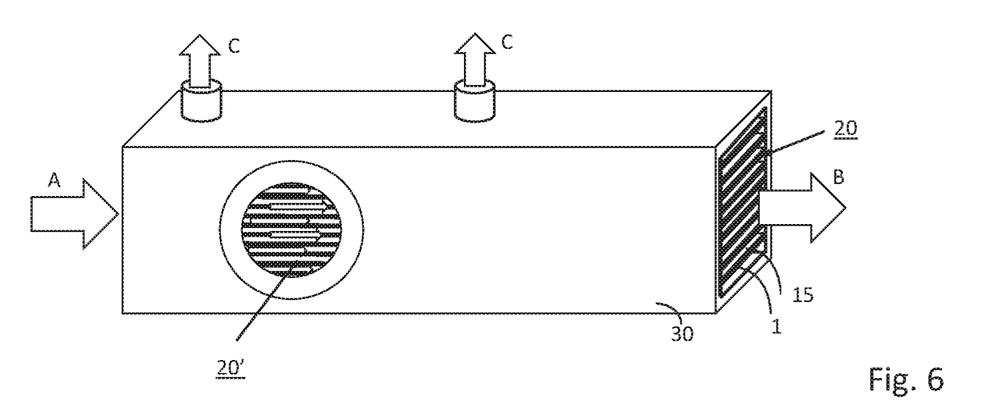
FIG. 6 is a perspective view of two filter-plate assemblies, one after the other, in a flow housing (30) the filter plate assemblies being built up by stacking of nine filter-plates (1) e.g. of the type shown in FIG. 1B, where the assembly has exit openings for flow of first liquid media (C) and gaps (15) between the filter plates (1) of the assemblies of filter plates (1) for flow of second liquid media (A, B).

The filter-plates are planar and can be stacked together using a few filter plates (1) to many dozens of filter plates (1) forming one bonded rigid filter-plate assembly. The filter-plates (1) are stacked with spacing or gaps (15) between the filter plates for the external or second media to be filtered, offering a gap or passage for access or flow of a second liquid media between the filter plates and in contact with the external surface of the membranes. The gaps (15) between the filter plates (1), e.g. as illustrated in FIG. 6, can be dimensioned to secure a free and unimpeded flow of media from inlet (A) to outlet (B) to be filtered and allows for flow of viscous media or media having suspended solids.

The free gaps (15) between planar filter-plates (1) allow for inspection of the membranes (7) and other parts being in touch with the second liquid media thus making visual inspection of cleaning operation and the filtration process possible.

In one embodiment, an assembly of the filter-plates (1) of the invention comprises a plurality of planar filter-plates (1), forming a rigid filter-plate assembly, said filter-plates are situated parallel juxtaposed having the filter area (roughly corresponding to the area of the external surface 7' of the filter 7)/flow area (6) facing the filter area/flow area (6) of an adjacent filter-plate. Said plurality of filter-plates (1) forming a square or rectangular entry for the second liquid media, such that said media may pass between the planar filter-plates (1) allowing for a large membrane/filter area on a small foot print, such that a large filter area may be obtained in a compact volume. The connection of the exits (4, 5) of each supporting plate (14) of the filter-plate (1), such as being bonded together by, e.g., welding or melting, form two or more combined exits extending transversely to the surface of said filter-plate assembly, e.g. such as is shown in FIG. 6 herein.

In one embodiment of said plurality of filter-plates forming a filter-plate assembly, the gap between the planar filter-plates (1) is filled with a spacer netting or mesh that creates turbulent flow over the filter area even at low cross flow volumes of the second liquid media and at the same time keeping the membrane (7) in place at low or negative pressures applied to the membrane (7).

In one embodiment of said plurality of planar filter-plates (1) forming a filter-plate assembly, said plurality of units is placed in a flow housing (30), said housing forming a square or rectangular inlet (at arrow A, in FIG. 6) and a square or rectangular outlet (at arrow B in FIG. 6) for the liquid media to be filtered, thus guiding the external second liquid flow at inlets and outlets and the internal first liquid flow at exit openings which in exemplary embodiments are provided transversely from the housing, shown with reference sign C in FIG. 6.

The filter-plate assembly comprising two or more bonded filter plates (1) with fluidly connected exit openings (4, 5) form a pressure vessel so that when a flow and a pressure are applied through an exit opening (4, 5), a flushing of the filter-plate may take place between two exits, thereby cleaning or scrubbing, i.a. all the internal surfaces and so also the internal surface (7") of the membrane (7) bonded to the external surface (2', 3') of the supporting plates (14).

The invention provides a filter-plate module which has, with respect to known liquid-to-liquid filters, such as plate filters, the advantages of having at the same time:

1) a flushable interior side, such as for turbulent flow of media or for flushing with a cleaning liquid, when provided with at least two exit openings in fluid connection,
2) an external free flow of a second liquid stream to be filtered,
3) a free-flow gap being defined by gap distance between filter plates (1 to 6 mm) when stacked, with the possibility for variation of distance in design of height of bonding points and this being further enabled by the use of discrete og molded in inlet pieces having a desired material thickness,
4) a possibility to use a large variety of membranes and fine filters improving filtration through low pressure losses,
5) a possibility to use a molded, bonded plastic plate as the supporting plate, reducing the need for material to a minimum, while having the individual planar filter-plates manufactured of relatively small thickness, however still rigid (3-8 mm thick supporting plate consisting of 2 bonded half-plates bonded together), all of which making a very compact and light filter-plate possible.

The filter-plate assembly has a shortened length of the flow paths of the second liquid medias to be filtered (10 to 100 cm) and a non-impeding (5 to 100 cm long) but relatively large inside flow area available for filtration, combined with a large active filter area, a plurality of flow leading channels for the first liquid stream or discharge leading to at least one larger essentially perpendicular exit opening (4, 5), and an overall structure with sufficient mechanical strength for it to keep a constant geometry at high cross flow rates and pressure gradients, guaranteeing the stability of the hydrodynamic conditions, under pressure, media and temperature constraints and at a satisfactory constructional cost.

The flow area used for filtration, such as between two liquid media, may in one embodiment be formed as a drainage grid, such as with a mesh like protrusion and groove structure where grooves are 0.2-2.0 mm wide giving similar space between protrusions (13) for supporting or lifting the membrane, the protrusions or lifting area may conveniently be formed without sharp points or ridges securing a sufficiently gentle carrier surface against outside pressure on the membrane. The flow area grooves (12), perforations (slits and holes) (10a, 10b) as well as internal flow channels (9a, 9b) are formed hydrodynamically, securing that minimal blocking and pressure loss will take place in the internal liquid flow path from and through the exit openings. The slits or holes (10a, 10b) that connect the inside flow channels with the flow area (6) on the external surface of the supporting plate are dimensioned to the needed flow and to physical size needed to the lifting of the membrane, typically 0.2-2.0 mm wide.

The filter-plates (1) can be sized according to need for total filter area in each module as well as to cost optimized production and are typically from 10 cm by 10 cm of filter area up to 50 cm by 100 cm filter area. The typical size for industrial applications is 20 cm by 20 cm up to 20 by 100 cm of filter area.

The planar filter-plates (1) are typically made of 3-8 mm thick supporting plates each of which are made up by bonding together of two half-plates (2, 3). The plate design, material and thickness are dimensioned to ensure a rigid construction of the filter-plate and assembled modules under turbulent external and internal flow. The inside flow channels (9A, 9B) in the supporting plate (14) are then formed by joining of the two half-plates. The flow channels (9A, 9B) can be of rounded cross section and a diameter thereof may typically be around half of the thickness of the supporting plate (14). The flow channels (9A, 9B) may be formed as individual flow channels, or be made up by mesh type volumes such as fish bone flow path used in heat exchangers. However, in either case, the design must consider flow and pressure losses, avoiding very low or very high flow speed areas. The inside flow channels (9A, 9B) lead to exit openings (4, 5) of the filter plates (1), which exit openings (4, 5) can be designed to lead liquids from (or in to) the filter-plate or stacked assembly of filter-plates to the exit with negligible pressure loss. Typically, the plate exit openings (4, 5) are 10-50 mm in diameter.

Materials used for the supporting plate (14) parts are typically plastics, such as polymeric or co-polymeric thermoplastics, but can be of hybrid material or metallic origin or any other suitable material that can be bonded and withstand the liquid media to be filtered, the temperature span needed, typically 5-95 degrees Celsius as well as the medias used for cleaning the various assembled modules and units. The choice of material must foresee thermal expansion and rigidity of the filter-plate/assembly. Preferred execution is supporting plates in molded plastic material, such as polypropylene, and with, e.g., a polymeric based membrane used for filter. Other executions can be as sintered parts or 3D printed versions in various materials.

Bonding of the various parts into a filter-plate and a filter plate assembly including half-plate to half-plate liquid tight bonding, membrane to supporting plate liquid tight bonding and filter-plates into stack bonding including bonding of inlet pieces on and between supporting plates may be by laser welding, rotation welding, direct or indirect heat-welding, in mold fabrication, ultrasonic welding, use of glue or hot-melt or solvents, or mechanically bonding with mechanical elements or connections designed into the parts. In the preferred execution, plastic parts are welded together through heat-applied melting of very specific areas of the designed parts, said filter plate parts being molded by injection molding of polymer thermoplastic. The membrane may be bonded to the supporting plate using a combination of hot-melt, in molding and welding to achieve liquid tight sealing.

By using thermoplastics such as polypropylene or polyethylene, the material of the supporting plate (or half-plates) can be recycled through re-melting of the plastic.

In an embodiment of the filter-plate assembly of the invention, the second liquid medium is pumped at a speed of typically 1 to 5 meters per second across the external surface of the membrane (7) to keep a high filtration efficiency and to keep possible suspended solids from building up and depositing on the membrane. The permeate or first liquid medium is free flowing or pumped at a speed of typically 0.5 to 2.5 meters per second through the flow channels and flow distribution areas and filter area in the supporting plate (14) and across the internal surface of the membrane (7) to minimize pressure loss, hereby keeping the filtration efficiency high and functional in operation for a longer time.

An embodiment of the invention is a filter-plate assembly, which provides a planar, rigid filter unit for filtration of liquid media, wherein a planar membrane (7), which is fluid tight bonded at its edges to the surface of a supporting plate (14) comprising a flow area (6) for a first liquid medium and internal flow channels (9a, 9b), the membrane being in fluid contact with said first liquid medium at its internal surface and being in fluid contact with a second liquid medium at its external surface. And in this embodiment the flow area is in fluid connection, such as through a flow path, to at least two exit openings (4, 5) for the first liquid medium, and the flow path comprising the internal flow channels (9a, 9b) and holes or perforations (10a, 10b) leading to the flow area (6) for liquid contact of the first medium with the internal surface of the membrane, thus providing filtration between the two liquid media. This embodiment is useful for forward osmosis operation where the first liquid medium is a draw medium and the second liquid medium has lower osmotic pressure than the draw (or vice versa).

A filter-plate (1) comprising a supporting plate (14) having at least one attached membrane (7) and wherein the supporting plate comprises at least two exit openings (4, 5) and at least two internal flow channels (9A, 9B), defining at least two independent sets of flow paths through said supporting plate which are in fluid connection with the at least one flow area (6) being sealingly covered by the at least one membrane, each set of flow paths comprising at least two paired exit openings (4, 5) being in fluid connection, and at least one internal flow channel (9A, 9B), such that said filter-plate (1) is configured for allowing liquid media to pass from a first exit opening (4) through one or more internal flow channels to said at least one flow area (6) and through one or more internal flow channels to a second exit opening (5).

In addition, the filter-plate (1) of the invention may, as shown in FIG. 3, have more than one flow area section (6', 6", 6"', 6""), where each flow area is in fluid connection and edgewise liquid tight sealed by bonding of a membrane (7). This embodiment provides multiple, such as 4, 5, 6 or more separate flow areas (6) on either side of the filter-plate (1), each area being fluidly connected consecutively to the next, so that a flow path from one exit (5) to another exit (4) is formed. Filtration areas are connected through a plurality of separate internal flow channels (9A/9B) and fluid connecting perforations (10A, 10B) in either end of the channels, forming an outlet from one flow area and an inlet to the next flow area. Perforations and internal channels are positioned to give a uniform flow over the flow area (6) below the membrane(s) (7, not shown here), cf. FIG. 3 below.

Having a plurality of flow areas (6', 6", 6"', 6"") sections numbered on one half on one side only) presents advantages when selecting bonding method for the membranes, selecting membrane area and up-scaling of flow area, compensating stiffness of supporting filter-plate and when selecting fabrication method of filter-plate.

DETAILED DESCRIPTION OF THE DRAWINGS

Other features and advantages of the invention are disclosed in the following description and examples of drawings, embodiments, working examples including manufacturing processes for the filter-plate and assembly thereof, and applications within filtration of liquid media, with reference to the accompanying drawings and reference numbers therein.

FIG. 1A Illustrate an embodiment of a filter-plate which may be formed by
- a) bonding at least one membrane (7) onto a filter-plate (1) having internal preformed flow channels (9A, 9B) in fluid connection (not shown) with a plurality of perforations (10A, 10B) opening onto a drainage flow area (6) on at least one external plate surface (outer side), where the bonding provides liquid tight sealing along the edges or periphery of the flow area (6); and
- b) the filter-plate (1) being formed by bonding of two fitting and equal-size half-plates (2, 3) along their edges, where the bonding provides liquid tight sealing, and the filter-plate (1) being provided with internal fluid connection with the flow channels (9A, 9B) and with two exit openings (4, 5) here shown with a cylindrical rim which may be integral with each half plate or which may be in the form of a discrete cylindrical or ring shaped inlet piece.

In addition, the filter-plate (1) may be provided with bonding points or protrusions (8) distributed spaced apart along the edges of both sides of the plate. The protrusions (8) function as bonding points and distance points when two or more filter-plates are stacked into a filter-plate assembly.

In the illustrated embodiment, the exit openings (4, 5) of the filter-plate is on opposite ends of the flow area (6) and the flow area is covered with an adjacent membrane with a cut out showing the drainage grid of the flow area (6) below the membrane. As indicated, a plurality of internal channels (9A and 9B) connect the two exit openings on the plate (1) to the flow area (6) via the perforations (10A, 10B) in either end of the flow area hereby forming a flow path under the membrane from exit (4) to exit (5). Bonding points (8) used when stacking the plates into a filter-plate assembly are also indicated. Said bonding points (8) together with the cylindrical, protruding exit openings or discrete inlet pieces (4, 5) define the distance between two plates (1). In the shown embodiment, the two half-plates (2, 3) are identical or laterally reversed. In some embodiments, the perforations (10A, 10B) constitutes of slits and/or holes.

An embodiment of the invention provides a rigid, planar filter-plate (1), comprising a partly internally channeled planar supporting plate (14) formed by liquid tight bonding of two planar, typically identical, half-plates (2, 3), the filter effect obtained through a membrane (7) in fluid contact with a first and a second liquid media having different pressures, and where the membrane (7) is peripherally bonded to and covering a flow area (6) for the first liquid medium on the supporting plate, where the area (6) is formed as a drainage grid having raised contact points (13) supporting the internal surface of the membrane (7); while at the same time having the second liquid media in fluid contact with the external membrane surface; the supporting plate having perforation slits or holes (10A, 10B) connecting the flow area (6) and the at least one channel (9A, 9B).

The channels inside the plates provides fluid connection for the first liquid media to at least two or more paired exit openings (4, 5) being perpendicular to the supporting plate, the exit openings forming integral exit channels in an assembly of filter-plates.

In a configuration of the invention with at least two exit openings in fluid connection as shown in FIG. 1A, it is possible to lead a media stream contacting the internal surface of the membrane to ensure optimal cross-flow filtration or optimal flushing with liquid cleaning media from one exit (4 or 5) to the other exit (5 or 4).

The flow area surface (6) is covered by liquid tight bonding or sealing of a flat membrane (7) along its perimeter whereby filtration can be achieved.

Figure 1B:
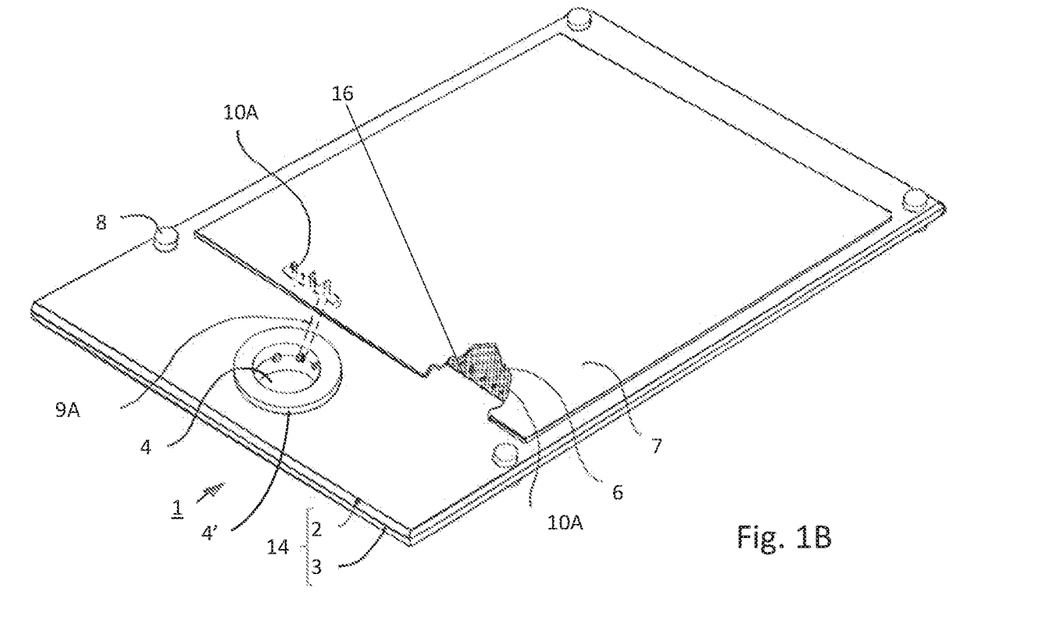
FIG. 1B is a perspective view of a filter-plate (1) comprising the supporting plate (14) comprising two half-plates (2, 3), exit opening (4) with cylindrical rim (4'), flow area (6), membrane (7), bonding points (8), internal flow channels (9A), and perforations (10A) leading from the internal flow channel (9a) to the flow area (6).

FIG. 1B Illustrate an embodiment of a filter-plate corresponding to the filter-plate of FIG. 1A except that it has one exit opening (4). The various components and constituents of the filter-plate are as described for FIG. 1A. The shown filter-plate (1) may be used for cross-flow filtration of a liquid medium, such as with separation into permeate and retentate.

FIG. 2 illustrates an exploded perspective view of a filter-plate assembly with two half-plates (2, 3) and two membranes (7). The upper half-plate (2) shows the external surface (2s) of the filter-plate (1) with the flow area (6) being in each end perforated with holes (10A, 10B), bonding points (8) and exit openings having protruding cylindrical rims (4', 5') being integrated in the half plate or the exit openings (4, 5) having fitting discrete inlet pieces. The lower half-plate (3) shows the half inside flow channels (9A, 9B) forming full channels when half-plates (2, 3) are bonded together, the channels connect the plate exit openings (4, 5) with the perforations (10A, 10B).

The embodiment shows a variation in layout of the inside channels (9A, 9B) forming a manifold for the flow channels (9A, 9B). The shown manifold may in another embodiment be replaced with an internal flow area or flow volume, for example being fish-bone shaped, to keep spacing between the half-plates (2, 3).

The exit openings (4, 5) can be placed as convenient, for example in opposite plate ends or corners or side by side, considering efficient flow or flow distribution of the channels (9A, 9B) as well as uniform flow distribution over the flow area (6) and/or membrane area (7).

In a larger filter-plate (1), more fluidly connected exit openings (4, 5) may be needed to secure flow and distribution of the first liquid medium.

The filter-plate comprises bonding points (8), the bonding points also functioning as distance points together with the protruding exit opening (4, 5) rims (4', 5') or inlet pieces, such that the second liquid medium can pass through the gap thus formed between the membrane(s) in-between two adjacent filter-plates in an assembled module, cf. Example 1 below.

The bonding points (8) in the form of raised studs or distance members are here illustrated as solid cylindrical protrusions extending transversely to the surface of the filter-plate (1). Alternatively, the distance between the plates can be supported by a mechanical member or bar positioned at the edge of the filter-plate.

FIG. 3 illustrates a perspective view of a supporting plate (14), having more than one section of drainage flow area (6', 6'', 6''', 6'''') with one flow area section shown with details of the flow area without the covering membrane. The figure shows eight drainage flow area sections (6', 6'', 6''', 6'''') on one side of the filter-plate. Not shown, in embodiments, there may be a corresponding eight flow area sections on the other supporting plate side. Each section (6', 6'', 6''', 6'''') is connected consecutively to the next through flow channels (9A, 9B) inside the filter-plate and perforations (10A, 10B) forming an outlet from one section and an inlet to the next flow area section. The perforations (10A, 10B) and internal arranged flow channels (9A, 9B) are positioned to give a uniform flow over the flow area (6) below the membrane (7).

Figure 4:
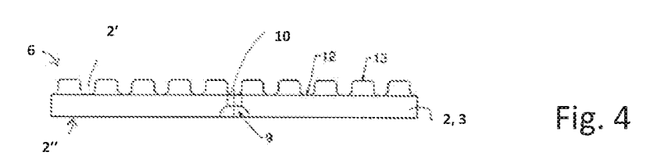
FIG. 4 is a cross section of a flow area (6) as formed on a half-plate (2, 3) showing one embodiment of a protrusion (13) and groove (12) structure formed on an external side (2') of the half plate (2) and the internal (half-) flow channel (9) Formed on an internal side (2") of the half-plate (2). Flow area view is shown without membrane. The grooves (12) and protrusion (13) are formed interchangedly in a grid structure. It will be appreciated, that when two identical (or mirrored) half-plates (2, 3) are assembled with their internal sides facing each other, the flow channels (9A, 9B) may thereby be formed. Further, flow areas (6) may be formed in the external side (2'). Also shown in FIG. 4 is a perforation (10), forming one of the above mentioned perforations (10A, 10B). The perforation (10) forms a fluid passageway between the flow area 6 on the external side of the half plate (2, 3) and the flow channel (9).

FIG. 4 Illustrates a cross-sectional view of a flow area (6) of a half filter-plate (2, 3), showing an example of an internal flow channel (9), a perforation (10), the grid structure of the flow area (6) below the adjacent membrane (7). The grid or mesh like structure of the flow area (6) is formed as an integral part of the half-plates (2, 3) and may be formed with indentions, protrusions (13) and grooves (12), the grooves forming channels for flow and the protrusions forming support areas for the membrane (7). The filter area grooves or channels are connected to the internal channels via the perforations (10A, 10B). The openness of the flow area (6) is designed to support the membrane, which again depends on the applied pressure on the membrane during various operation types and the type of membrane, as may be needed during operations using a relatively high pressure across the membrane and a relatively thin or brittle membrane may need several support points, protrusions or ridges (13), to ensure a free flow area in the grooves (12) facing the internal surface of the membrane.

Figure 5:
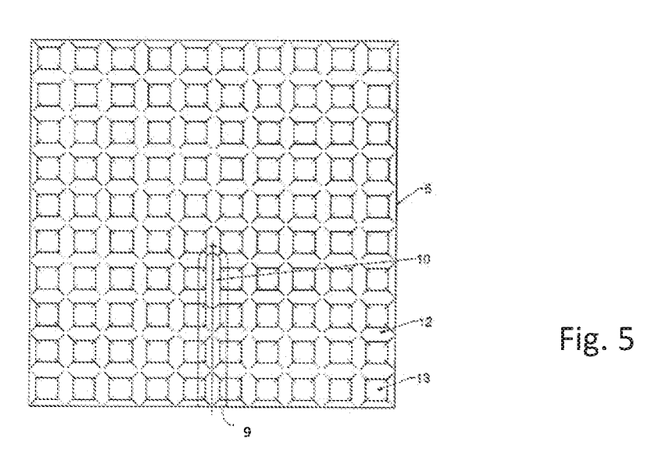
FIG. 5 is a top view of the drainage grid or mesh with grooves (12) and protrusions (13) forming the flow area (6) in fluid contact through perforation (10) and flow channel (9) in the supporting plate. The grooves (12) and protrusion (13) are formed interchangedly in a grid structure. From FIG. 5 it will further be appreciated that the grooves are formed as elongate depressions or indentations, which are formed in, but not through a the external surface of the half plate.

FIG. 5 illustrates a top view of an example of a section/portion of the drainage grid forming the flow area on the filter-plate. The grid is formed as a 3-D patterned flow area (6) to fit below the attached membrane ((7) not shown). The grooves (12) form a grid of flow channels and the protrusions or platforms (13) that support the membrane can be formed in a symmetrical grid or mesh as shown. The groove (12) and protrusion (13) construction comprises a perforation (10) which is shown as an elongated opening (a slit) in the groove area leading to a flow channel (9) on the internal surface of the filter-plate. The flow channel (9) provides fluid connection to an exit opening or to a neighboring flow area, cf. FIG. 3. The flow area (6) may in other embodiments direct the liquid flow with more open groove areas and/or be made with narrower grooves forming a relatively more flow impeding area which may secure a uniform turbulent flow speed in fluid contact with the internal surface of the membrane (7).

FIG. 6 shows a perspective view of a filtration module. This example shows two filter-plate assemblies (20, 20') built up by a plurality of planar filter plates (1, FIG. 1B), positioned one after the other, inside a filter housing (30). Arrows show the exit flows of first liquid media (C) via exit openings out through the housing and the external flows of second liquid media (from A to B) via gaps (15) between the filter-plates (1) providing cross-flow filtration/operation.

During CIP cleaning—Cleaning In Place—liquid cleaning media are most often only used on the external or outer surface of the filter-plates in a modular or stacked assembly, where the cleaning liquid entering at (A) and leaving at (B), and often at high flow rates to ensure cleaning of all surfaces. In the shown embodiment cleaning of the internal surfaces inside the filter-plates (1) is foreseen as in conventional cross flow elements, where the cleaning flow during cleaning of outer side of the filter plates may also enter through the membrane and via the internal flow area and channels may exit at (c) as this is in general sufficient for cleaning the unit inside and out.

Not shown in the presented illustrations are examples of internal channels (9A, 9B) formed as individual flow volumes instead of separate channels in a manifold, such as the overlaying fishbone like curve-shapes described above. Also, not shown are examples of a separate mesh positioned below the attached membranes on the planar filter-plates (1). In addition, an open structured mesh fitted in between filter-plates (1) may further increase turbulence of the flow of the second liquid medium or retentate, if needed, and may protect the membrane from hydraulic pressure differences.

An optional execution not show is where the membrane is formed on the flow area on the filter plate. This could be as example a built up, molded on, sintered, or 3D printed membrane or filter member.

The bonded assembly of a plurality of filter-plates shall have a sufficiently rigid structure to provide good dimensional stability under mechanical, thermal and chemical stress.

All parts of the filter plates and filter module can be of food and pharmaceutical grade material with traceable origins, making the filter-plate and modular assembly suitable for filter operations of liquid human food, consumables, pharmaceuticals, and the likes. The plate materials used are preferably of a plastics material that can be reused by re-melting, or be burned as a clean fossil-like fuel.

All plastics parts of the unit can be produced by 3D printing or sintering of other means.

The skilled person in filtration process will know that the filter-plates (1) described herein can also be used in filters for gas-to-gas as well as for gas-to-liquid media, where gas tight conditions are required, such as for evaporation and or condensation on either one or both sides of the membrane.

Additional embodiments of the invention are described below:

A filter-plate assembly, wherein said filter-plate assembly comprises a plurality of planar filter-plates (1) being situated parallel juxtaposed having the external surface of the membrane on one filter plate facing the external surface of the membrane of an adjacent filter-plate, said plurality of—filter-plates forming a square or rectangular entry geometry for a liquid media (A) such that said media is able to pass between the planar filter-plates, and where the at least two perpendicular exit openings (4, 5) are formed by discrete inlet pieces, such as cylindrical or ring shaped inlet pieces, or formed as integrated parts of said half-plates (2, 3), and where the distance between the planar units is defined by the height of the rims of the exit openings (4, 5) and of the bonding points (8).

A filter-plate assembly, wherein the supporting filter-plate (1) comprises at least two exit openings (4, 5) and at least two internal flow channels (9A, 9B), defining at least two independent sets of flow paths through said filter-plate, and which are in fluid connection with the at least one flow area (6), each set of flow paths comprising at least two exit openings (4, 5) being in fluid connection, and at least one internal flow channel (9A, 9B), such that said filter-plate assembly (20) is configured for allowing liquid media (C, D) to pass from a first exit opening (4) through one or more internal flow channels to said at least one flow area (6) and through one or more internal flow channels to a second exit opening (5).

A filter-plate assembly (20), which) comprises an additional open mesh between opposite juxtaposed filter-plates (1), said additional open mesh being configured for flow of liquid media and for creation of a turbulent flow between said planar filter-plates at low flow volume, while also keeping the membranes (7) fixed, hereby allowing for flush of the membranes with a negative pressure across the membrane. The skilled person of the art will be aware that different modifications can be made to the embodiments described above as well as the working example described below, without departing from the scope of the invention.

WORKING EXAMPLES

Example 1. Manufacture of a Filter-Plate, Filter-Plate Assembly and Filter Module Prototypes The manufacture of a filter unit comprising 4 filter modules, each comprising aa flow housing and a filter plate assembly comprising a stack of 33 filter-plates of the invention having six flow areas in fluid connection on both sides of the supporting plate follows the steps below.

Injection molding of half-plates using a semi-crystalline homopolymer of polypropylene, to outer dimensions of these being 240×200×2 mm, making the bonded supporting plate 4 mm thick. These dimensions lead to a very rigid base plate with two exit openings, connected to the internal manifold channels, that lead to five individual channels, but successively interconnected flow areas on the external surface of the plate. The flow areas together cover approximately 190×190 mm on both sides of the supporting plate, and a 0.2 mm semipermeable polypropylene based membrane cast on a non-woven mesh covers the five flow areas and is sealingly heat-bonded around each flow area. Hereby an effective, rigid filter-plate unit, with high chemical and thermal span of operation, is manufactured out of plastics only.

The planar filter plates (1) are build up into a rigid stack of 33 plates forming a filter-plate assembly of 2.5 m² (square meters) of filtration surface. In building up the stack of plates, fitting ring shaped inlet pieces are rotation welded in one fast operation to the exit of two juxtaposed plates in one operation, and the bonding points on the perimeter are also heat-bonded together so that these together with the exits secure a uniform distance of 1.6 mm of free gap between the filter-plates (1).

The exit openings and inlet pieces have an internal diameter of 16 mm, and in the built up module there are 4 resulting exits where in operation 2 of these are entries for the first media or permeate and 2 are exits for said first media or permeate. The exits each connect to the internal manifold in the plates and said manifold is formed by 2 mm channels in the plate formed when the 2 half plates are connected. The internal flow channels lead to the first flow area connecting to this through slits in the half-plates, and the same design is used between consecutive flow areas, and from last in the row flow area to the other protruding exit.

The assembly is then positioned into a pressure withstanding molded polypropylene flow housing to create a filter module having four 16 mm exit openings for the first media: 2 openings for inlet and 2 openings for outlet, where said exits are sealingly connected to the assembly as well as sealed in towards the flow housing. The second media can enter the module through a 200 mm×200 mm opening in each end of the housing giving access to the gaps between the stacked filter-plates. The flow housing allows for several modules to be stacked forming large filter units. In a given example 4 modules are stacked making a filter unit with 10 m² filter surface.

Results Achieved

By leading a fairly large flow of 600 L/min of a second media through the flow channel and a flow of 60 L/min of a first media out from the filter module with 2.5 square meter filter surface, we measured a resulting filtration flux similar to that of similar size traditional plate filter, however the overall energy consumption was less than half of traditional designs, such as plate an frame units or hollow fiber units.

It is to be noted that the figures and the above description have shown the example embodiments in a simple and schematic manner. Many of the specific mechanical details have not been shown since the person skilled in the art should be familiar with these details and they would just unnecessarily complicate this description.

The invention claimed is:

1. A filter plate comprising:
two membranes, each of the membranes being attached on opposite sides of a rigid and planar supporting plate formed from bonding of two essentially identical half plates, the membranes forming a membrane area on each of the half plates, wherein each of said half plates comprises at least one exterior membrane-covered flow area and at least one perpendicular fluid-connecting perforation that connects the exterior membrane-covered flow area to one or more flow channels, the exterior membrane-covered flow area on one of the half plates is independent of the exterior membrane-covered flow area of the other one of the half plates;
and wherein each of the two attached membranes is fluid tight sealed to a perimeter of one of the exterior membrane-covered flow areas formed on the supporting plate to define an integrated drainage grid provided with protrusions from the supporting plate that support the attached membrane, the integrated drainage grid further including a plurality of drainage grooves between the protrusions that lead a first liquid that enters the filter plate by permeating the attached membrane to the perpendicular fluid-connecting perforations that further leads the first liquid into the flow channels in the filter-plate, the flow channels subsequently leading the first liquid to at least one perpendicular exit opening outside the membrane area that includes the two attached membranes,
and wherein the plurality of drainage grooves are interconnected such that the first fluid can flow along multiple paths within the integrated drainage grid after permeating the attached membrane.

2. The filter plate according to claim 1, where the half plates are manufactured by molding of polymeric material.

3. The filter plate according to claim 1 where the half plates are edgewise sealingly bonded to each other by thermal fusion.

4. The filter plate according to claim 1, where the at least one attached membrane is a woven filter or a molded organic membrane on non-woven material.

5. The filter plate according to claim 1, further comprising a second exit opening fluidly connected to the exit opening to form a flow path that includes two or more exterior membrane-covered flow areas in one of the half plates, the two or more exterior membrane-covered flow areas being fluidically connected to each other via second perpendicular perforations and second internal flow channels, each of the two or more exterior membrane-covered flow areas including the plurality of drainage grooves that are interconnected, the first fluid capable of flowing toward the exit opening or the second exit opening after permeating the attached membrane.

6. A filter plate assembly comprising two or more of the filter plates according to claim 1.

7. A filter plate assembly comprising two or more filter plates according to claim 1, being situated parallel juxtaposed having the external surface of the membrane on one of the filter plates facing the external surface of the membrane of an adjacent one of the filter plates, said two or more filter plates forming a square or rectangular entry geometry for a liquid media, such that said media is able to pass between the filter plates, and where the at least two perpendicular exit openings are connected by discrete inlet pieces, or by protrusions formed as integrated parts of said half plates, and where the distance between the filter plates is defined by the height of the rims of the exit openings and of the bonding points.

8. The filter plate assembly according claim 7, comprising an additional open mesh between opposite juxtaposed ones of the filter plates.

9. A filter module comprising a filter plate assembly according to claim 6, mounted in a flow housing forming a square or rectangular inlet and/or outlet area for the liquid media to be filtered.

10. The filter module of claim 9, wherein the liquid media for filtration is a turbid and/or viscous media.

11. The filter plate according to claim 1, where the half plates are manufactured by molding of polymeric material and are at least edgewise sealingly bonded by thermal fusion, where each of the membranes is a fine woven filter or a molded organic membrane on non-woven material or a filter being built up on the filter-plate, and where the filter plate has two or more fluidly connected exit openings with one or more of the exterior membrane-covered flow areas between the two or more fluidly connected exit openings.

12. The filter plate according to claim 1, further comprising at least two exit openings connected with each of the exterior membrane-covered.

13. The filter plate according to claim 1, wherein each of the half plates comprises at least two exit openings and at least two internal flow channels, providing at-least two independent flow paths through the half plate that lead to the at least two exit openings.

14. A filter plate comprising:
a first membrane and a second membrane;
a first planar half plate and a second planar half plate, each of the first and second half plates having an interior side, an exterior side, and an exit opening extending from the interior side to the exterior side, the first and second half plates being bonded together on the interior sides such that the exit openings of the first and second half plates are aligned, each of the first and second half plates having a recessed flow area section on the exterior side, the first membrane being bonded around a periphery of the recessed flow area section of the first half plate to define a first flow region within the first half plate, the second membrane being bonded around a periphery of the recessed flow area section of the second half plate to define a second flow region within the second half plate, the first half plate including first flow channels formed in the interior side that fluidically couple the first flow region to the exit opening of the first half plate, the second half plate including second flow channels formed in the interior side that fluidically couple the second flow region to the exit opening of the second half plate, the first half plate includes an first array of contact protrusions within the recessed flow area section that contacts the first membrane and creates a first drainage grid within the first flow region, the second half plate includes a second array of contact protrusions within the recessed flow area section that contacts the second membrane and creates a second drainage grid within the second flow region, the first flow region being independent of the second flow region;
and wherein a liquid media flowing externally to the filter plate results in a permeate fluid (i) permeating through the first and second membranes to enter the first and second flow regions, (ii) passing through the first and second flow channels, and (iii) exiting the filter plate from the exit openings.

15. The filter plate according to claim 14, wherein each of the first and second half plates incudes a second exit opening that allows the permeate fluid to exit from the filter plate.

16. The filter plate according to claim 15, wherein the exit openings and the second exit openings are on opposite sides of the first and second flow regions.

17. The filter plate according to claim 14, wherein the first flow channels and the second flow channels are aligned when the first and second half plates being bonded together.

18. The filter plate according to claim 14, wherein the first half plate includes at least one fluid-connecting perforation that connects the first flow region to the first flow channels, wherein the at least one fluid-connecting perforation is located at a bottom of one of the first flow region and is adjacent to a plurality of contact protrusions within the first array of contact protrusions.

19. A filter plate comprising:
a first planar half plate and a second planar half plate;
wherein the first half plate has an interior side, an exterior side, and an exit opening extending from the interior side to the exterior side, the first half plate being bonded to the second half plate on the interior side, the first half plate having a plurality of recessed flow area sections on the exterior side, a first one of the plurality of recessed flow area sections being adjacent to the exit opening and being fluidically coupled to the exit opening via exit flow channels formed in the interior side, each of the plurality of recessed flow area sections being fluidically coupled to an adjacent one of the plurality of recessed flow area sections by section flow channels, each of the plurality of recessed flow area sections including an array of contact protrusions, each of the plurality of recessed flow area sections being contained within the first half plate and independent of the second half plate; and
at least one membrane structure bonded to the exterior side of the first half plate, the at least one membrane structure covering the plurality of recessed flow area sections and contacting the array of contact protrusions within each of the plurality of recessed flow area sections to create drainage grids, each of the drainage grids within the plurality of recessed flow area sections including a plurality of drainage grooves that are interconnected such that a first fluid can flow along multiple paths within the drainage grid after permeating through the membrane.

20. The filter plate according to claim 19, wherein the first half plate includes a second exit opening, the plurality of recessed flow area sections being fluidically connected to the exit opening and the second exit opening such that the first fluid permeating through the membrane is capable of exiting the filter plate from either the exit opening or the second exit opening.

* * * * *

UNITED STATES PATENT AND TRADEMARK OFFICE
CERTIFICATE OF CORRECTION

| | |
|---|---|
| PATENT NO. | : 11,813,576 B2 |
| APPLICATION NO. | : 16/978521 |
| DATED | : November 14, 2023 |
| INVENTOR(S) | : Henrik Hjelmsmark |

It is certified that error appears in the above-identified patent and that said Letters Patent is hereby corrected as shown below:

In the Claims

At Column 19, Line 21 (Claim 12, Line 3), after "exterior membrane-covered" please insert --flow areas--.

Signed and Sealed this
Twelfth Day of December, 2023

Katherine Kelly Vidal
*Director of the United States Patent and Trademark Office*